May 2, 1967 R. B. NAWMAN 3,317,674

PAY TELEPHONE STATION

Filed Nov. 18, 1963 4 Sheets-Sheet 1

INVENTOR.

Rollie B. Nawman

BY Flehr & Swain

Attorneys

INVENTOR
Rollie B. Nawman
BY Flehr & Swain
Attorneys

May 2, 1967 R. B. NAWMAN 3,317,674

PAY TELEPHONE STATION

Filed Nov. 18, 1963 4 Sheets-Sheet 3

INVENTOR.

Rollie B. Nawman

BY [signature]

Attorneys

May 2, 1967 R. B. NAWMAN 3,317,674

PAY TELEPHONE STATION

Filed Nov. 18, 1963 4 Sheets-Sheet 4

INVENTOR.
Rollie B. Nawman
BY
Attorneys

United States Patent Office 3,317,674

Patented May 2, 1967

3,317,674

PAY TELEPHONE STATION

Rollie B. Nawman, Piedmont, Calif., assignor to Benner-Nawman, Inc., Oakland, Calif., a corporation of California Filed Nov. 18, 1963, Ser. No. 324,567
15 Claims. (Cl. 179—6.3)

This application is a continuation-in-part of my application Ser. No. 270,323, filed Apr. 3, 1963, and now abandoned.

This invention relates to a pay telephone station and more particularly to a pay telephone station which makes use of a conventional pay telephone and which is particularly secure against theft or burglary.

Telephone companies have always been plagued with theft of monies collected in pay telephones particularly where those pay telephones are located in isolated locations or in particular areas which have a high incidence of crime. There is, therefore, a need for a pay telephone station which is more secure for use in such locations.

In general, it is an object of the present invention to provide a pay telephone station which is very secure to prevent robberies or thefts while at the same time utilizing a conventional pay telephone.

Another object of the invention is to provide a pay telephone station of the above character which can be readily opened.

Another object of the invention is to provide a pay telephone station of the above character, the cover of which can be moved to an out-of-the-way open position to permit complete access to the pay telephone.

Another object of the invention is to provide a pay telephone station of the above character in which it is very difficult, if not impossible, to determine how it is constructed when the cover is in a closed position.

Another object of the invention is to provide a pay telephone station of the above character in which the means for securing the front cover to the back plate is concealed from view.

Another object of the invention is to provide a pay telephone station of the above character which can be opened only with one or more keys.

Another object of the invention is to provide a pay telephone station of the above character in which conventional pay telephones of different types can be utilized.

Another object of the invention is to provide a pay telephone station of the above character which can be constructed economically and easily installed.

Additional objects and features of the invention will appear from the following description in which the preferred embodiment is set forth in detail in conjunction with the accompanying drawings.

Referring to the drawings.

Figures 1, 2:
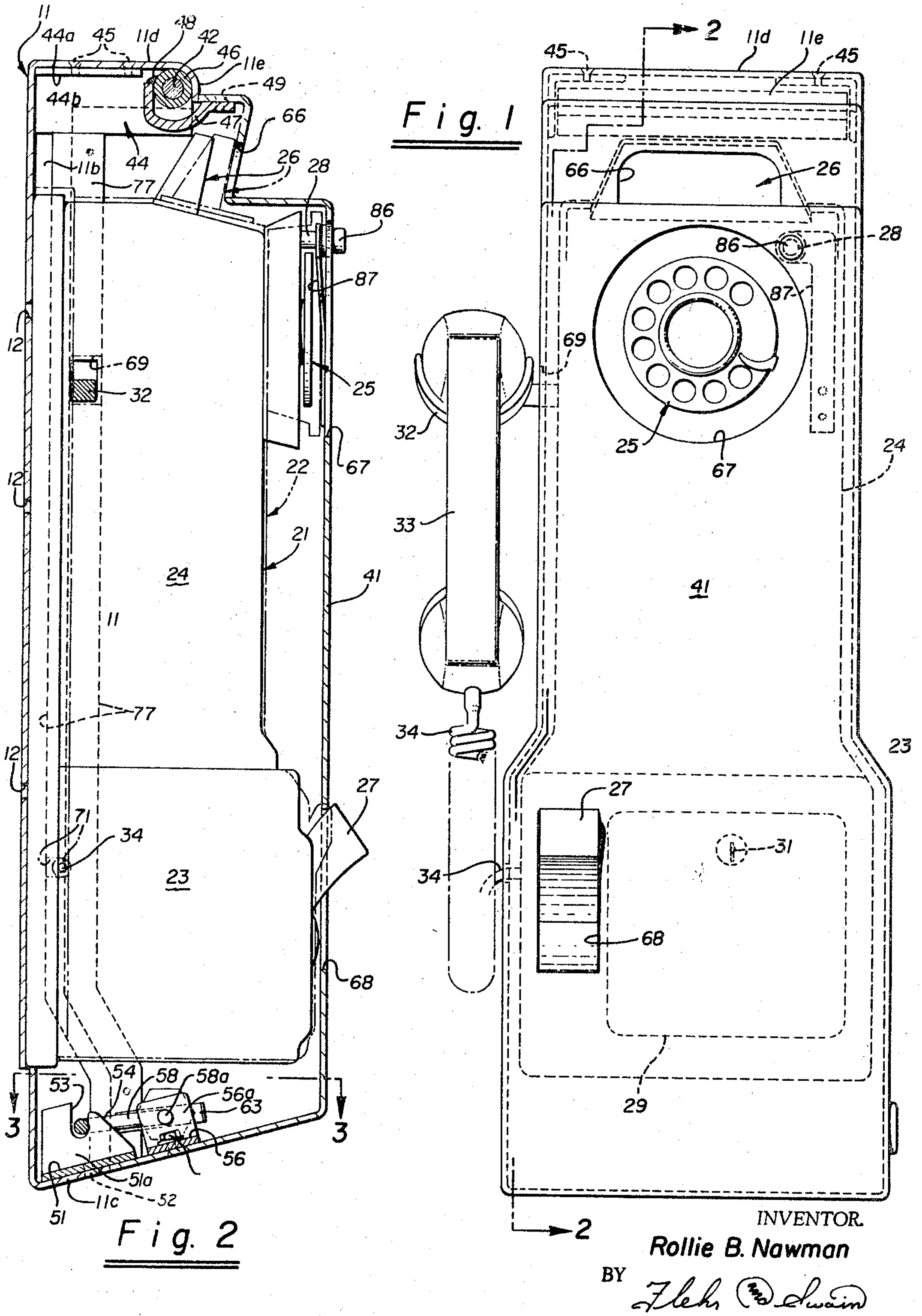
FIGURE 1 is a front elevational view of a pay telephone station incorporating my invention.
FIGURE 2 is a cross-sectional view taken along the line 2—2 of FIGURE 1.

In general, my telephone pay station consists of a conventional pay telephone. A front cover which has substantially the same configuration as the pay telephone is provided with an opening to permit access to certain portions of the pay telephone as, for example, the telephone dial, the coin receiving means and the coin return slot. Means is provided for securing one portion of the front cover to the pay telephone. Means is also provided for latching another portion of the front cover to the back plate to prevent unauthorized opening of the front cover.

As shown in FIGURES 1 to 6 of the drawings, my pay telephone station consists of a back plate 11 which is substantially rectangular in configuration. This back plate is provided with a plurality of holes 12 to permit the back plate to be firmly secured to a suitable supporting member (not shown) by suitable means such as bolts (not shown). The back plate 11 is provided with forwardly extending side portions **11*a* and 11*b*, a forwardly extending bottom portion 11*c* and a forwardly extending top portion 11*d*. In addition, the back plate is provided with a downwardly turned curved portion 11*e* which forms an integral part of the portion 11*d***.

A pay telephone 21 of a conventional type such as one made by Automatic Electric is secured with the back plate 11 to a supporting member (not shown) in a conventional manner as hereinbefore described. Another type of pay telephone such as that manufactured for Bell Telephone is indicated by the broken line 22. As is well known to those skilled in the art, such pay telephones consist of a lower housing 23 and an upper housing 24. It also consists of a dial 25 mounted on the upper housing and which is provided for dialing the desired telephone number. Such a pay telephone is also provided with a coin receiving means 26, a coin return chute 27 and a coin release button 28. Such a pay telephone also includes a hinged door 29 which is provided with a keyhole 31 which can be opened by telephone company employees to permit access to the coin box and the coins therein collected by the pay telephone. Such a pay telephone also includes a handset cradle or hook 32 movable between first and second positions for connecting and disconnecting the pay telephone to the telephone line to which it is connected. A handset 33 of a conventional type is normally retained by the cradle 32 and is connected by a cord 34 which connects the handset to the remainder of the telephone and extends through an opening provided in the lower housing case 24.

A front cover 41 is provided which is adapted to cover the pay telephone 21 as shown in FIGURES 1 and 2 of the drawing. This front cover 41 has a configuration which is generally similar to the configuration of the pay telephone.

Means is provided for securing one portion of the cover 41 to the back plate and consists of a hinge pin 42 which has its opposite ends mounted in holes 43 in a pair of hinge brackets 44. Each of the brackets 44 is provided with an upper portion 44*a* which is secured to the portion 11*d* of the back plate 11 by suitable means such as plug welds 45 (see FIGURE 2). Each of the hinge brackets is also provided with a downwardly extending side portion 44*b* which lie adjacent the portions 11*a* and 11*b*.

A sleeve 46 is rotatably mounted upon the hinge pin 42 and is positioned within the interior of the curved area formed by the portion 11*e*. An L-shaped member 47 has one leg affixed to the sleeve 46 by suitable means such as welding indicated at 48. The other leg of the L-shaped member 47 is secured to the upper extremity of the cover 41 by suitable means such as plug welds 49 (see FIGURE 2). With such hinge means, it is readily apparent that the cover 41 can be moved between open and closed positions by raising and lowering the lower end of the cover so that it pivots about the hinge pin 42.

Figures 4, 5, 6:
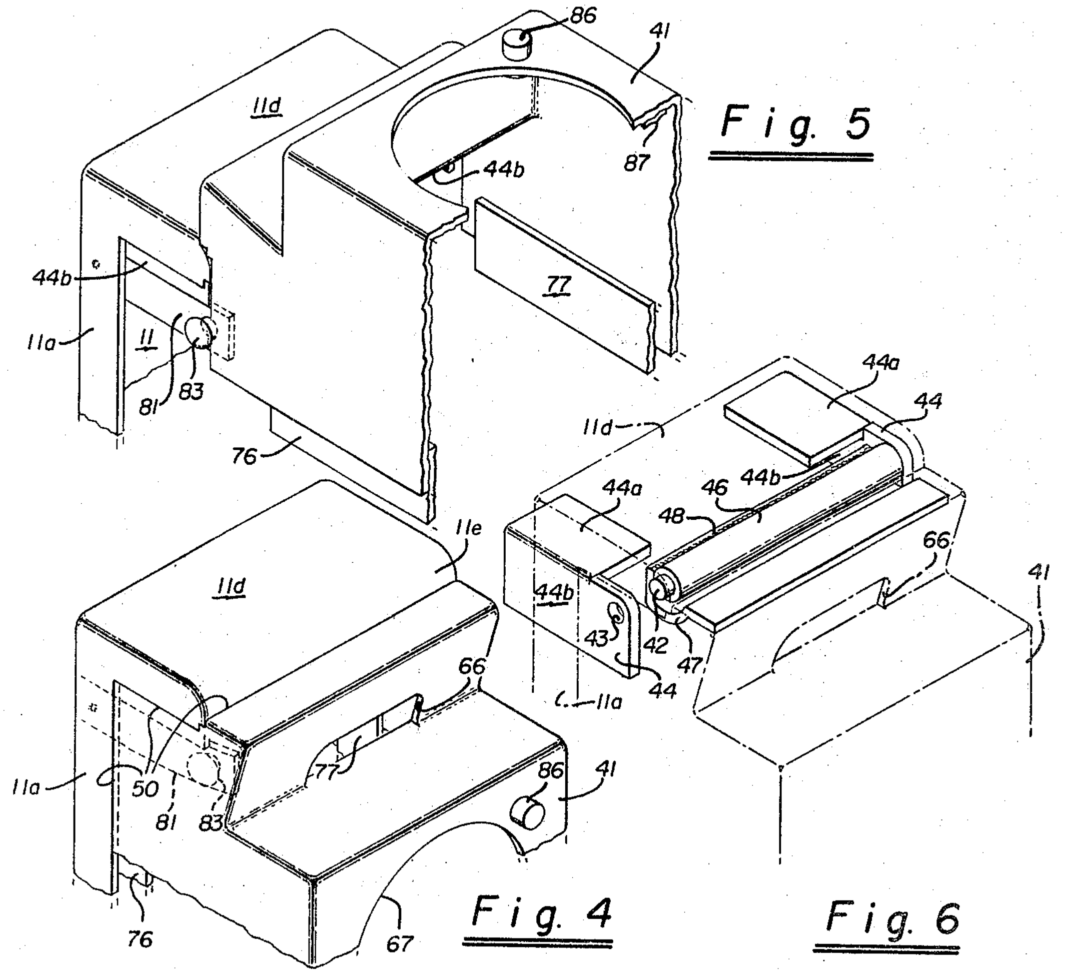
FIGURE 4 is a partial isometric view of the case for the pay telephone station shown in FIGURES 1 and 2.
FIGURE 5 is a partial isometric view of the case for the pay telephone station with the front cover in a raised position.
FIGURE 6 is an isometric view partially exploded of the hinge assembly used for securing the front cover to the back plate of the case for the pay telephone station.
Figure 3:
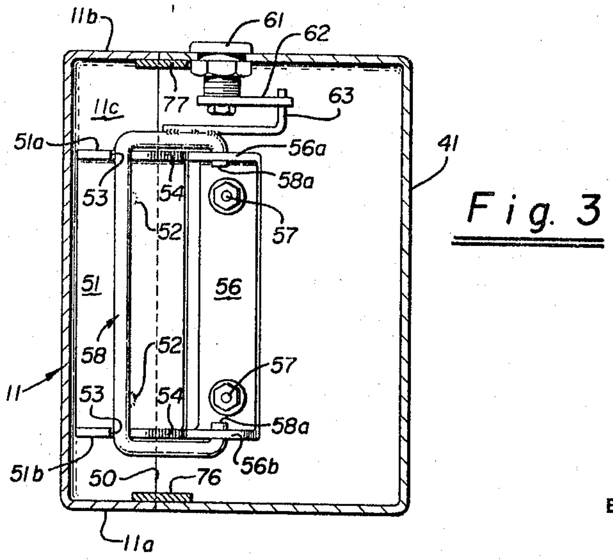
FIGURE 3 is a cross-sectional view taken along the line 3—3 of FIGURE 2.
Figures 7, 8, 11:
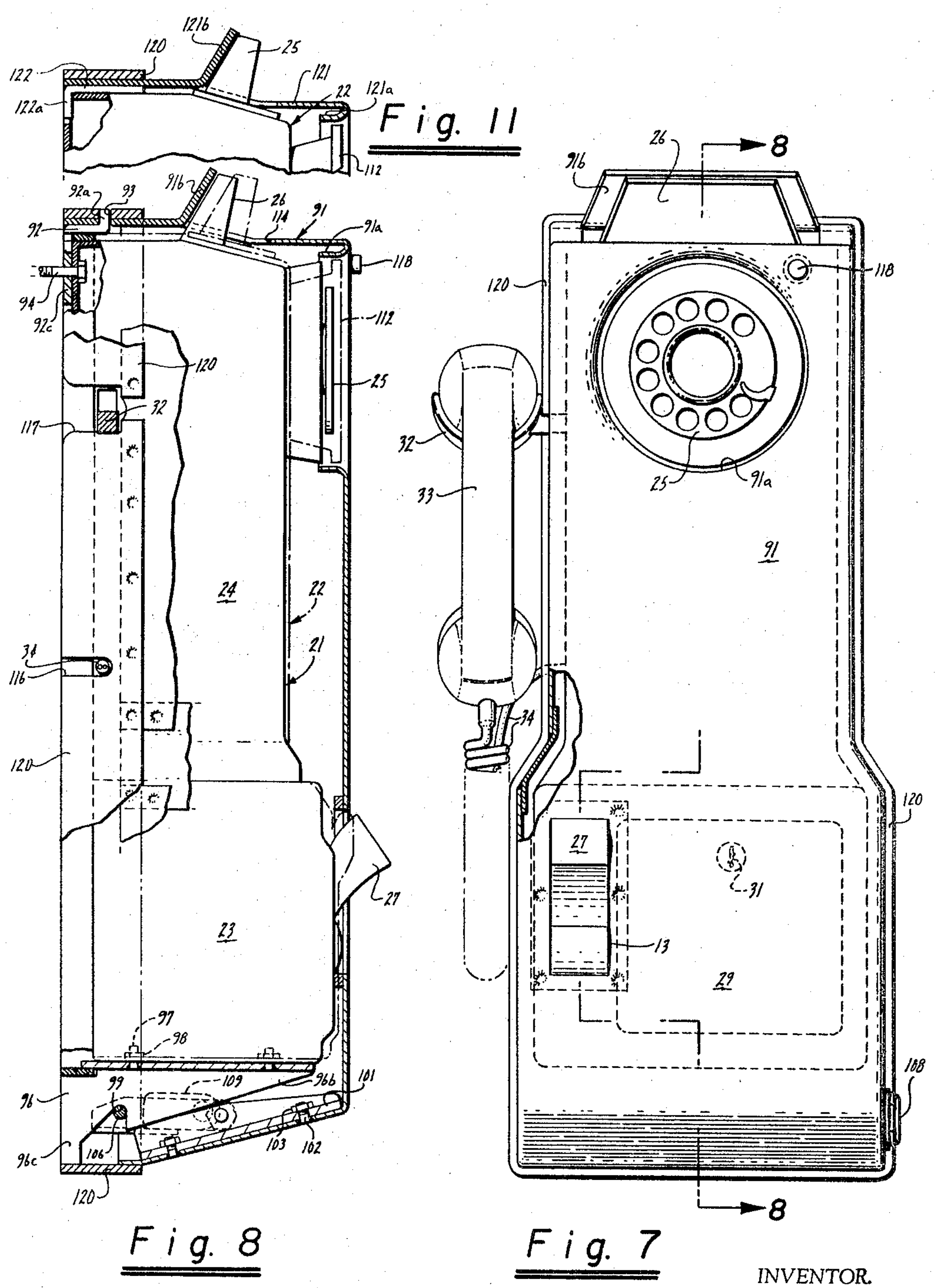
FIGURE 7 is a front elevational view of another embodiment of my telephone station incorporating my invention.
FIGURE 8 is a cross-sectional view taken along the line 8—8 of FIGURE 7.
FIGURE 11 is a partial side elevational view similar to FIGURE 8 but showing the manner in which it is secured to a telephone of the type manufactured by the Bell Telephone Company.

The fit between the upper extremity of the cover 41 and the curved portion 11*e* is such that as the cover 41 is opened about the hinge pin 42, the upper extremity of the cover is in relatively close contact to the curved portion 11*e* in all positions of the cover as can be seen from FIGURES 4 and 5. The particular hinge means utilized is advantageous because it is not apparent from the exterior how the front cover is hinged to the back plate 11. The plug welds 46 and 49 are flush with their respective surfaces and also are covered by paint or a suitable plating at the same time the exterior of the cover and the back plate are covered. All that is visible is the break line 50 between the front cover 41 and the back plate 11.

Means is provided for releasably securing the cover 41 to the back plate 11 and consists of a U-shaped bracket 51 which is secured to the portion 11*c* of the back plate 11 by suitable means such as plug welds 52. The bracket 51 is provided with vertically upstanding portions 51*a* and 51*b*. A downwardly extending arcuate recess 53 is provided in each of the portions 51*a* and 51*b*. The portions 51*a* and 51*b* are also provided with an upwardly and forwardly inclined front surface 54, the upper extremity of which is rounded and leads into the recess 53.

A U-shaped bracket 56 is secured to the lower portion of the front cover 41 by suitable means such as screw head bolts 57. After the bolts 57 have been put in place, the heads of the bolts are welded over and smoothed so that the heads are not visible from the exterior. The bracket 56 is provided with upstanding ears 56*a* and 56*b*. The inturned ends 58*a* of a U-shaped latch rod 58 are pivotally mounted in the upstanding portions 56*a* and 56*b*. The rod 58 is dimensioned so that when the cover 41 is in a closed position as shown in FIGURE 2, the rod 58 will drop into the recesses 53 of the bracket 51 by force of gravity. Means is provided for releasing the latching rod and consists of a lock 61 mounted in the cover 41 which is adapted to be operated with a key. This lock 61 is provided with an arm 62 which is adapted to engage an L-shaped arm 63 which is secured to the latch rod 58 as shown particularly in FIGURE 3.

The front cover 41 is provided with a number of openings to permit use of the pay telephone which is enclosed by the cover. Thus, as shown in the drawings, the front cover is provided with an opening 66 to permit access to the coin receiving means 26 of the pay telephone. Similarly, the front cover is provided with a circular opening 67 to permit access to the dial 25 of the telephone. A rectangular slot 68 is provided to give access to the coin return chute 27. On the side of the cover 41, an elongate slot 69 is provided to accommodate the cradle 32. A hole 71 is provided in the back plate 11 to accommodate the cord 34 for the handset 33.

Means is provided to prevent inserting tools or implements such as a screwdriver or a chisel in the break line 49 between the front cover 41 and the back plate 11 and consists of a pair of flat metal straps 76 and 77 which are secured by suitable means such as spot welding to the inside of the cover 41 in a position so that they extend rearwardly beyond the cover and so that they overlap the portions 11*a* and 11*b* of the back plate 11 when the cover is in a closed position.

Means is provided for retaining the cover in an open position and consists of a spring steel plate member 81 which is secured to the portion 11*a* of the back plate 11 by suitable means such as spot welding. A knob 83 is mounted on the free end of the spring member 81 and forms an annular recess with the member 81 which is adapted to receive the upper extremity of the cover 41, when the cover 41 is in a raised position as shown particularly in FIGURE 5. The outer portion of the knob 83 is rounded to permit the cover to readily clear the knob when the knob is pushed inwardly by hand to permit the cover to be closed.

Means is provided on the front cover 41 for operating the coin release button 28 and consists of a plunger 86 slidably mounted in the front cover for movement into engagement with the button 28 to permit operation of the button 28. Means is provided for yieldably urging the plunger 86 outwardly and consists of an L-shaped spring member 87 having one end engaging the plunger 86 and the other end spot welded to the cover 41 as shown in FIGURE 1.

Operation and use of my pay telephone station may now be briefly described as follows. If it is desired to utilize my additional enclosure consisting basically of the back plate 11 and the front cover 41 as a security box for a conventional pay telephone, the back plate 11 and the telephone 21 are first mounted as hereinbefore described. After this has been accomplished, the front cover 41 can be allowed to slam closed and the rod 58 will be cammed upwardly and will drop by force of gravity into the slots 53. The cover 41 will then be locked in position.

When the cover is in this latched or locked position, the pay telephone can be used in a conventional manner. Coins can be placed through the slot 66 into the coin receiving means 26. The dial 25 can be operated through the hole 67. Return coins can be collected through the hole 68 from the coin return chute 27.

When a telephone company man wishes to repair the telephone or to collect the coins which have been collected by the pay telephone, it is merely necessary for the telephone company man to place a key in the lock 61 and to rotate the arm 62 to lower the L-shaped member 63 to raise the rod 58 out of the recesses 53 so that the lower extremity of the cover can be pulled outwardly. As soon as this has been accomplished, the cover 41 can be lifted upwardly about the hinge pin 42 until it is in a substantially horizontal position. The spring member 81 yieldably urges the knob 83 outwardly so that the upper extremity of the cover 41 engages the knob 83. The cover 41 will then be retained in this position by the knob 83 so that the telephone company man can, if he desires, open the door 27 by placing another key in the lock 31 to remove the coins. Since the cover 41 is retained in this position, the telephone company man can actually remove the upper housing 24 of the telephone and make repairs on the telephone if desired.

Additional embodiments of my telephone pay station are shown in FIGURES 7–12. These embodiments also include a front cover 91 which is quite similar to the front cover 41 provided in the embodiment shown in FIGURES 1–6. The front cover 91 has a configuration which generally conforms to the configuration of the pay telephone to be enclosed.

Means is provided for securing one portion, namely, the upper portion of the cover 91 to the pay telephone and consists of a bracket 92 which has its upper end extending through a slot 93 provided in the upper portion of the cover 91. As shown particularly in FIGURES 8 and 10, the bracket 92 is provided with an upwardly extending portion 92*a* which extends into the slot 93, a horizontal portion 92*b* which extends to the rear and a downwardly extending portion 92*c* which extends down behind the pay telephone and which is secured to the support for the pay telephone by suitable means such as a screw 94.

Means is provided for securing another portion, namely, the lower portion of the front cover 91, to the pay telephone and consists of a bracket 96 which is mounted on the pay telephone 21 by slipping a portion **96*a* in a recess in the rear portion of the telephone. In addition, the bracket 96 can be secured to the lower housing 23 by suitable means such as threaded studs 97 which are secured to the bracket 96 by suitable means such as welding and which extend upwardly through the housing 23 and are secured thereto by nuts 98**.

The bracket 96 is provided with depending side portions **96*b* and downwardly extending abutments or ears 96*c*. Generally V-shaped recesses 99 are formed in the portion 96*b*** intermediate the ends of the same.

Means is provided on the lower portion of the front cover for releasably engaging the bracket 96 and consists of a U-shaped mounting plate 101 which is secured to the lower portion of the front cover 91 by suitable means such as threaded studs 102 welded to the front cover 91 and which extend through the mounting plate 101. Nuts 103 are threaded onto the studs 102 and serve to secure the mounting plate 101 to the lower portion of the front cover 91.

A U-shaped latch rod 106 has its ends pivotally mounted in the mounting plate 101. Means is provided for continuously and yieldably urging the outer extremity of the latch rod in an upward direction toward the bracket 96 and consists of a spring 107 which has one end secured to the mounting plate 101 as shown in FIGURE 10 and has the other end engaging the latch rod 106.

Figures 9, 10, 12:
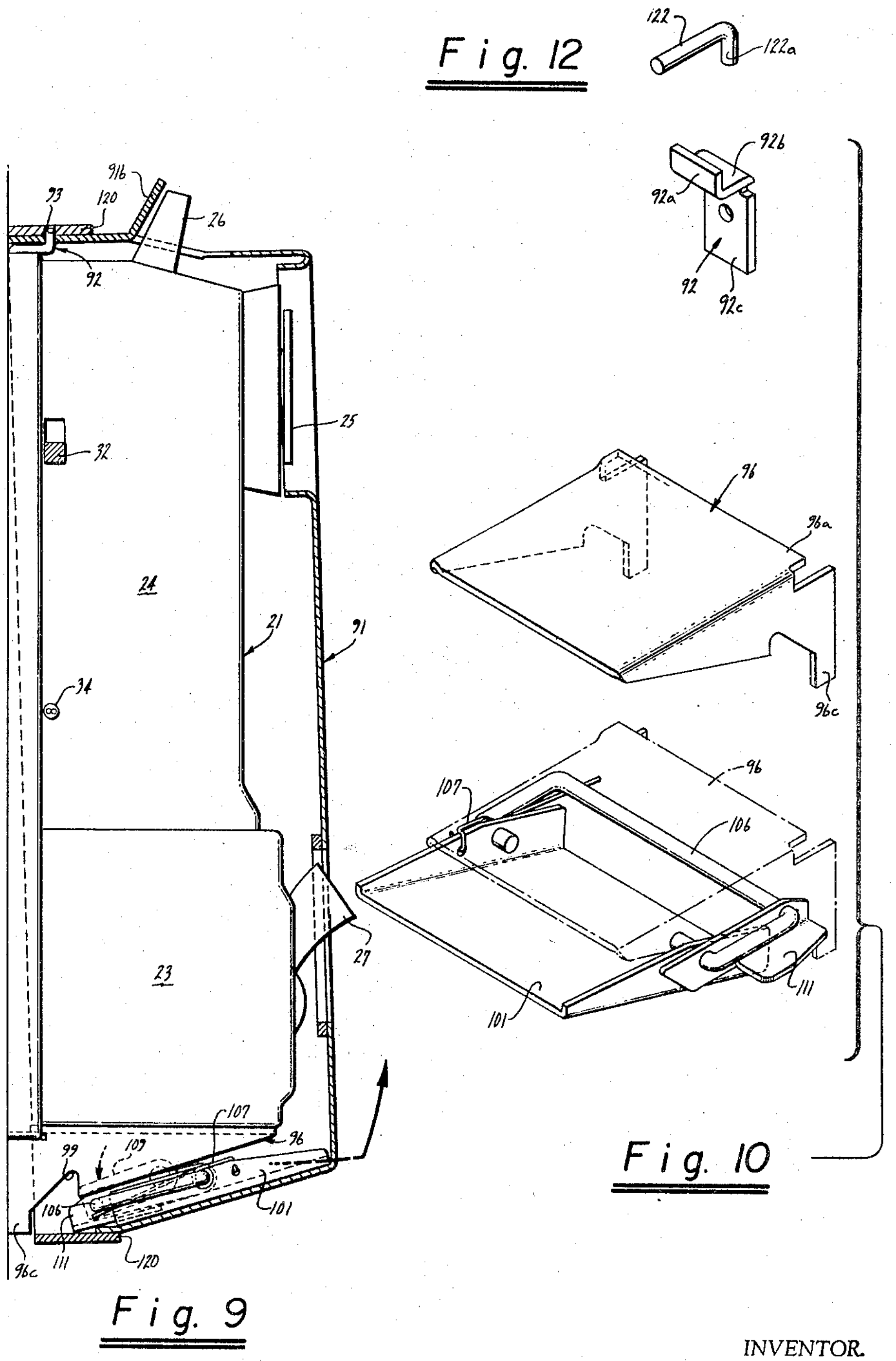
FIGURE 9 is a side elevational view similar to FIGURE 8 showing movement of the front cover so that it can be released from the telephone.
FIGURE 10 is an exploded view of certain of the parts utilized in my pay telephone station shown in FIGURE 7.
FIGURE 12 is an isometric view of one of the parts utilized in the embodiment shown in FIGURE 11.

Means is provided for moving the latch rod in a direction against the force of the spring and consists of a lock 108 which is provided with an arm 109 that is adapted to engage and move an L-shaped arm 111 mounted on one side of latch rod 106 when a key is inserted in the lock 108 and rotated, as shown particularly in FIGURE 10.

The front cover 91 is also provided with a number of openings to permit use of the pay telephone which is enclosed by the cover. Thus, as shown in the drawings, the front cover 91 is provided with a circular opening 112 to permit access to the dial 25 of the telephone. As can be seen from FIGURE 8, this circular opening 112 is provided by forming an annular shoulder **91*a* which defines the opening and which is disposed adjacent the dial 25 and the pay telephone so that there is relatively little space between the opening 112 and the dial 25. A rectangular slot 113 is provided for the coin return chute 27. An opening 114 is provided in the upper portion of the cover 91 through which the coin receiving means 26 extends. An upwardly inclined portion 91*b* is provided adjacent the rear of the coin accepting means 26 to prevent a tool or other device from being inserted between the portion 91*b* and the coin accepting means 26**.

The front cover is also provided with a slot 116 for receiving the cord 34. It is also provided with a slot 117 for receiving the cradle hook 32. A plunger 118 is mounted in the cover 91 for operating the coin release button 28.

Reinforcing means is provided on the cover 91 in the form of a heavy strip 121 which extends about the rear portion of the front cover 91 and is secured thereto by suitable means such as welding.

Operation and use of the pay telephone station as shown in FIGURES 7–10 may now be briefly described as follows. The pay telephone can be used in the conventional manner. Coins can be placed into the coin receiving means 26. The dial can be operated through the hole 112 and the return coins can be collected through the hole 13 provided in the coin return chute 27.

When a telephone company man wishes to repair the telephone or collect the coins which have been received by the pay telephone, it is merely necessary for the telephone company man to place a key in the lock 108 and to thereby rotate the arm 109. Rotation of the arm 109 causes it to engage the L-shaped arm 111 to move the latch rod 106 downwardly against the force of the spring 107 out of the slots 99 formed in the side plates **96*b* as soon as the latch rod 106 has been moved downwardly. As soon as this has been accomplished, one or both hands may be utilized to grasp the lower part of the front cover 91 to move it outwardly away from the telephone as shown in FIGURE 9. After the ears 96*c* have been cleared by the lower extremity of the front cover 91, the entire front cover 91 is raised upwardly and moved off of the upwardly extending portion 92*a***. As soon as this has been done, the entire front cover can be removed to permit the desired operation on the pay telephone.

After work on the pay telephone has been completed, the cover can be replaced merely by placing the slot 93 over the upper portion **92*a* of the bracket 92. Thereafter, the front cover 91 can be allowed to swing inwardly with the inclined surfaces of the downwardly depending portion 96*b* of the bracket 96 camming the latch rod 106 downwardly to the rear until it encounters the recess 99 and is urged upwardly into the recess 99. As soon as this has been accomplished, the front cover 91 is secured in position. The front cover is constructed in such a manner so that it is impossible or substantially impossible to determine the manner of construction so that the front cover 91**, in effect, makes the pay telephone substantially burglar-proof.

In the case of the pay telephones manufactured by the Bell Telephone Company, I have found that it requires a slightly different front cover 121 which is provided with an upwardly inclined portion **121*a*. It is also provided with an L-shaped rod 122 which is secured to the front cover 121 by suitable means such as welding. The L-shaped rod is formed in such a manner so that its downwardly extending portion 122*a*** can extend down behind the Bell Telephone substantially equi-distant between the side edges of the telephone.

From the foregoing, it can be seen that I have provided a new and improved telephone pay station in which the conventional pay telephone is enclosed within a security box which makes it very difficult, if not impossible, to break into the pay telephone to make unauthorized removal of coins from the pay telephone. In addition, the security box for the pay telephone is substantially tamper-proof because it is not apparent from the external appearance of the security box how the security box is put together. The hinge means for the front cover is concealed as is the latch means for locking the front cover in a closed position.

The configuration of the security box for the pay telephone has substantially the same configuration as the pay telephone and, therefore, takes very little additional space. In addition, the construction of the security box is such that it can be economically and rapidly manufactured. The security box can be installed without any alterations on the conventional pay telephone. Also, the security box is sized so that it can accommodate pay telephones of the various types as, for example, the automatic electric pay telephone and the pay telephone utilized by the Bell System.

I claim:

1. In a telephone pay station, a pay telephone, the pay telephone having a case, a dial for dialing telephone numbers mounted on the case and facing outwardly from the case, a cradle arm mounted in the case for movement between first and second positions, a hand set, a cord connected to the hand set and passing into said case, said hand set being adapted to rest upon said cradle, said pay telephone also having coin receiving means and coin return means, a front cover having a configuration similar to the configuration of the pay telephone, means for securing one portion of the front cover so that it overlies the pay telephone, means for releasably latching another portion of the front cover so that the front cover encloses the pay telephone, said means for securing said one portion of the front cover and for securing another portion of the front cover including means to permit the front cover to be removed from the pay telephone, the front cover having an access opening to the means for receiving coins in the pay telephone, another access opening to the dial of the pay telephone, and another access opening for accommodating the coin return chute of the pay telephone.

2. A telephone pay station as in claim 1 wherein said means for securing one portion of the front cover includes hinge means mounted within the cover and concealed from view when the cover is enclosing the pay telephone.

3. A telephone pay station as in claim 1 wherein said means for securing one portion of the front cover includes a member secured to the front cover and having a portion thereof extending behind the pay telephone.

4. A telephone pay station as in claim 1 together with a back plate and wherein said means for securing one portion of the front cover secures the front cover to the back plate and wherein said means for releasably latching another portion of the front cover serves to latch the front cover to the back plate.

5. A telephone pay station as in claim 1 wherein said means for releasably latching another portion of the front cover includes a bracket having a recess therein, a latch rod adapted to seat in said recess, and key operated means mounted in the front cover and adapted to engage the latch rod to move the latch rod out of engagement with said recess.

6. In a telephone pay station, a back plate, a pay telephone mounted upon the back plate, the pay telephone having a case, a dial for dialing telephone numbers mounted on the case and facing outwardly from the case, a cradle mounted in the case for movement between first and second positions, a handset, a cord connected to the handset and passing into said case, said handset being adapted to rest upon said cradle, said pay telephone also having coin receiving means and coin return means, a front cover having a configuration similar to the configuration of the pay telephone, means for securing one portion of the front cover to the back plate, and means for releasably latching another portion of the front cover to the back plate to prevent unauthorized opening of the front cover, the front cover having an access opening to the means for receiving coins in the pay telephone, another access opening to the dial of the pay telephone, and another access opening for accommodating the coin return chute of the pay telephone.

7. A telephone pay station as in claim 6 wherein said means for securing the front cover to the back plate for movement between open and closed positions consists of hinge means mounted within the back plate and the front cover and means securing the hinge means to the back plate and the front cover, said last named means being concealed from view from the exteriors of the back plate and the front cover.

8. A telephone pay station as in claim 6 wherein said means for latching the front cover to the back plate includes a weight-loaded latch member.

9. A telephone pay station as in claim 6 together with overlapping side portions secured to the front cover and movable with the front cover, said overlapping portions overlapping the line of separation between the back plate and the front cover.

10. A telephone pay station as in claim 6 together with means for retaining the front cover in an open position.

11. A telephone pay station as in claim 10 wherein said means for retaining the front cover in open position consists of a spring member secured to the back plate and a knob mounted on the spring member.

12. In a telephone pay station, a back plate, a pay telephone mounted upon the back plate, the pay telephone having an enclosing case, a dial for dialing telephone numbers facing forwardly of the case, a cradle mounted in said case for movement between first and second positions, a handset, a cord connected to said handset and passing into said case, said handset being movable to be positioned in said cradle to maintain said cradle in its first position, said pay telephone having means for receiving coins and a coin return chute, a front cover having a configuration similar to the configuration of the telephone case, means for hinging the upper end of the front cover to the upper end of the back plate, and means secured to the lower extremity of the back plate and the front cover to lock the front cover into a position enclosing the pay telephone to prevent unauthorized tampering with the pay telephone, said front cover having openings to permit access to the coin receiving means, the telephone dial, and the coin return chute of the pay telephone.

13. A pay telephone station as in claim 12 wherein said hinge means consists of rod and sleeve members, one of the members being secured to the back plate and the other of the members being secured to the front cover, said hinge means being enclosed within said front and back covers so that they are invisible from the exteriors of the front and back covers.

14. A pay telephone station as in claim 12 wherein said means for latching the front cover in a closed position consists of a U-shaped member secured to the back plate, a U-shaped member secured to the front cover, and cooperative means consisting of a U-shaped rod having its ends pivotally mounted in one of said U-shaped members and slots formed in the other of said members, an intermediate portion of said U-shaped rod being adapted to engage the slots provided in the other of said U-shaped members.

15. In a telephone pay station, a pay telephone, the pay telephone having an enclosing case, a dial for dialing telephone numbers facing out forwardly of the case, a cradle mounted in said case for movement between first and second positions, a handset, a cord connected to said handset and passing into said case, said handset being movable to be positioned in said cradle to maintain said cradle in its first position, said pay telephone having means for receiving coins and a coin return chute, a front cover having a configuration similar to the configuration of the telephone case, means secured to the upper portion of the front cover and having a portion thereof extending rearwardly of the pay telephone, a bracket secured to the lower portion of the pay telephone, latch means secured to the front cover and adapted to engage said bracket on said case, means yieldably urging said latch means into engagement with said bracket, and key operated means mounted in said case for moving said latch means out of engagement with said bracket, said front cover having openings to permit access to the coin receiving means, the telephone dial and a coin return chute of the pay telephone.

References Cited by the Examiner

UNITED STATES PATENTS

| | | | |
|---|---|---|---|
| 2,371,968 | 3/1945 | Lum | 179—6.3 |
| 3,148,246 | 9/1964 | Hannula | 179—6.3 |

KATHLEEN H. CLAFFY, *Primary Examiner.*

H. ZELLER, *Assistant Examiner.*